Figure 1A:
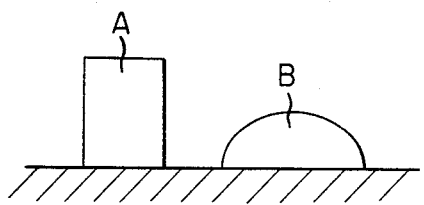

United States Patent [19]

Iizawa

[11] 4,142,906
[45] Mar. 6, 1979

[54] GLASS COMPOSITION FOR ALKALI-RESISTANT GLASS FIBER

[75] Inventor: Yoshihiro Iizawa, Tokorozawa, Japan

[73] Assignee: Ikebukuro Horo Kogyo Co., Ltd., Japan

[21] Appl. No.: 881,893

[22] Filed: Feb. 27, 1978

[30] Foreign Application Priority Data

Jun. 6, 1977 [JP] Japan .................. 52-65840
Jan. 27, 1978 [JP] Japan .................. 53-7373

[51] Int. Cl.² .................. C03C 13/00; C03C 3/08; C04B 31/06
[52] U.S. Cl. .................. 106/50; 106/54; 106/99
[58] Field of Search .................. 106/50, 99, 54

[56] References Cited

U.S. PATENT DOCUMENTS

| | | | |
|---|---|---|---|
| 3,861,926 | 1/1975 | Irlam et al. .................. | 106/50 |
| 3,861,927 | 1/1975 | Kimma et al. .................. | 106/50 |
| 3,969,121 | 7/1976 | Atkinson .................. | 106/50 |
| 4,014,705 | 3/1977 | Yale .................. | 106/50 |
| 4,066,465 | 1/1978 | Mohri et al. .................. | 106/50 |

Primary Examiner—O. R. Vertiz
Assistant Examiner—Mark Bell
Attorney, Agent, or Firm—Wenderoth, Lind & Ponack

[57] ABSTRACT

This invention relates to a glass composition for alkali-resistant glass fiber, which comprises:
(a) 30 – 57% by weight of $SiO_2$;
(b) 12 – 26% by weight of $ZrO_2$;
(c) 14 – 26% by weight of $R_2O$ (wherein R represents Na, K or Li);
(d) 1 – 11% by weight of R'O (wherein R' represents Ca, Ba, Mg, Zn or Co);
(e) 0.1 – 6% by weight of $CaF_2$;
(f) 0.1 – 10% by weight of $M_2(SiF_6)$ (wherein M represents Na, K or Li); and
(g) 0.1 – 12% by weight of $B_2O_3$.

This invention further relates to a glass composition for alkali-resistant glass fiber, which comprises:
(a) 30 – 57% by weight of $SiO_2$;
(b) 12 – 25% by weight of $ZrO_2$;
(c) 14 – 26% by weight of $R_2O$ (wherein R represents Na, K or Li);
(d) 1 – 11% by weight of R'O (wherein R' represents Ca, Ba, Mg, Zn or Co);
(e) 0.1 – 6% by weight of $CaF_2$;
(f) 0.1 – 10% by weight of $M_2(SiF_6)$ (wherein M represents Na, K or Li);
(g) 0.1 – 12% by weight of $B_2O_3$;
(h) an effective amount of up to 3% by weight of $TiO_2$;
(i) an effective amount of up to 3% by weight of $Al_2O_3$; and
(j) an effective amount of up to 3% by weight of $Fe_2O_3$.

4 Claims, 2 Drawing Figures

GLASS COMPOSITION FOR ALKALI-RESISTANT GLASS FIBER

DETAILED EXPLANATION OF THE INVENTION

This invention relates to a glass composition. More particularly, this invention relates to a glass composition for glass fiber used in a cement product as a reinforcing material.

It is well known that glass fiber used as a reinforcing material for cement must be alkali-resistant, and that zirconium oxide is an effective ingredient to impart alkali-resistant properties to glass. The well known $ZrO_2$-containing alkali-resistant glass contains 10–25% by weight of $ZrO_2$. However, the conventional $ZrO_2$-containing alkali-resistant glass composition has disadvantages is that the fiberizing temperature or glass liquefaction temperature is very high, e.g. 1100° C.–1300° C., due to the presence of the $ZrO_2$, and that the viscosity of molten glass at high temperature is very high.

The present invention provides a glass composition for alkali-resistant glass fiber having a high alkali-resistance as well as a low melting point, without the above mentioned disadvantages of the prior arts.

Thus, an object of the present invention is to provide a glass composition for alkali-resistant glass fiber, which comprises 30–57% by weight of $SiO_2$; 12–26% by weight of $ZrO_2$; 14–26% by weight of $R_2O$ (wherein R represents Na, K or Li); 1–11% by weight of R'O (wherein R' represents Ca, Ba, Mg, Zn or Co); 0.1–6% by weight of $CaF_2$; 0.1–10% by weight of $M_2(SiF_6)$ (wherein M represents Na, K or Li); 0.1–12% by weight of $B_2O_3$; 0–3% by weight of $TiO_2$; 0–3% by weight of $Al_2O_3$; and 0–3% by weight of $Fe_2O_3$.

In the glass composition of the present invention, $SiO_2$ is the main ingredient which constitutes the fundamental structure of the glass. It is not desirable for the amount of $SiO_2$ added to be less than 30% by weight (hereinafter simply referred to as %) since the strength of the glass then decreases. On the other hand, if the amount of $SiO_2$ added is higher than 57% the alkali-resistance is lowered since $SiO_2$ is an acidic material, and the fiberization operation becomes difficult since the viscosity of the molten glass becomes high.

If the amount of $ZrO_2$ added is less than 12%, the desired alkali-resistance is not achieved. If it is higher than 26%, the melting point of the glass composition becomes too high to melt.

$R_2O$ works as a solubilizing agent for $SiO_2$ and $ZrO_2$. If the amount of $R_2O$ added is less than 14%, the solubilities of $SiO_2$ and $ZrO_2$ become poor. If it is higher than 26%, the physical properties of the glass undesirably lose balance. At least two of the $R_2O$ ingredients should preferably be used in order to avoid an increase in the melting point of the glass composition due to a high relative content of $ZrO_2$.

R'O has the same function as $R_2O$, and the amount of R'O added is limited to 1–11% for the same reasons as above. In the case of R'O also, at least two of the R'O ingredients should preferably be used in combination.

$CaF_2$ is a strong flux. It is not desirable to use it in an amount of more than 6% since it begins to corrode refractory material. On the other hand, if the amount of $CaF_2$ added is less than 0.1%, its effect as a flux is not achieved. Thus, it is preferably used in an amount of 1–5%, more preferably 2–4%.

$B_2O_3$ is a requisite ingredient to lower the melting point of the glass composition. It is not desirable to use it in an amount of more than 12% since such a high amount of $B_2O_3$ lowers the alkali-resistant properties. If the amount of $B_2O_3$ added is less than 0.1%, its desired effect on the lowering of the melting point can not be achieved. Accordingly, it is preferably used in an amount of 3–10%, more preferably 4–8%.

$TiO_2$ is an ingredient necessary for lowering the viscosity of a molten glass composition. However, it is not desirable to use it in an amount of more than 3% since such a high amount of $TiO_2$ lowers the alkali-resistant properties.

Both $Al_2O_3$ and $Fe_2O_3$ contribute to improvement of the alkali-resistant properties, but neither of them should be used in an amount of more than 3%. If the amount added exceeds 3%, the melting point of the glass composition is undesirably raised.

$M_2(SiF_6)$ works as a strong flux for $SiO_2$, $ZrO_2$ and the like in the same manner as $CaF_2$, but it must be used in an amount of not more than 10% or it undesirably corrodes refractory material. In place of or in admixture with $M_2(SiF_6)$, other silicofluorides such as M'($SiF_6$) (wherein M' is at least one of Ca, Ba, Mg and Zn) may be used in an amount of 0–10% by weight.

The glass composition of this invention is characterized by its low melting property (glass liquefaction temperature = 750° C.–900° C.) in spite of it being a high zirconia-containing glass. This low melting property is particularly favourable in view of the energy required to melt the glass composition, workability, corrosion of refractory material and the other properties. This low melting property is due to a low silica content and multi-component system glass composition, and it is also due to the fact that $CaF_2$ and silicofluorides are used in relatively high amounts to improve the melting properties of the raw materials, thus facilitating vitrification.

The glass composition of the present invention is useful as a starting material for making fibers by means of well known techniques. In preparing the starting material, minerals containing $SiO_2$ and $ZrO_2$ such as zircon sand and the like can be used.

The present invention is further illustrated by the following examples.

EXAMPLES

The following glass compositions listed in Table 1 were tested with regard to alkali-resistant properties, and the results are shown in Table 1.

Table

| Ingredients | Examples | | | | | | | Comparative Example |
|---|---|---|---|---|---|---|---|---|
| | 1 | 2 | 3 | 4 | 5 | 6 | 7 | E-glass |
| $SiO_2$ | 30.0 | 31.0 | 38.5 | 46.0 | 48.0 | 57.0 | 66.7 | 53.7 |
| $ZrO_2$ | 26.0 | 24.2 | 23.2 | 12.0 | 21.5 | 17.0 | 10.0 | — |
| $B_2O_3$ | 12.0 | 5.6 | 5.6 | 3.0 | 7.0 | 8.0 | — | 8.2 |
| $Na_2O$ | 23.0 | 14.9 | 15.0 | 15.0 | 15.0 | 14.0 | 11.7 | 0.2 |
| $K_2O$ | 1.0 | 0.7 | 0.5 | 0.7 | 0.7 | — | 1.0 | 0.1 |
| $Li_2O$ | 2.0 | 2.2 | 1.0 | 2.8 | 1.0 | — | 0.9 | — |
| $CaF_2$ | 1.6 | 3.0 | 2.2 | 6.0 | 2.5 | 0.7 | 2.9 | — |

Table-continued

| Ingredients | Examples | 1 | 2 | 3 | 4 | 5 | 6 | 7 | Comparative Example E-glass |
|---|---|---|---|---|---|---|---|---|---|
| $Na_2SiF_6$ | | 2.0 | 4.5 | 10.0 | 4.0 | 2.3 | 2.5 | — | — |
| $K_2SiF_6$ | | 1.0 | — | — | — | — | — | — | — |
| CaO | | 1.0 | 4.3 | 1.9 | 2.5 | — | 1.0 | 1.2 | 20.2 |
| CoO | | — | 2.2 | 1.0 | — | — | — | 1.1 | — |
| MgO | | — | 0.5 | — | — | — | — | — | 2.2 |
| BaO | | — | 3.0 | 1.0 | 3.0 | 1.0 | — | 4.5 | 0.7 |
| ZnO | | — | 1.0 | — | — | — | — | — | — |
| $Al_2O_3$ | | 0.4 | 0.5 | — | 2.0 | 0.5 | — | — | 1.3 |
| $Fe_2O_3$ | | — | 0.5 | — | — | — | — | — | — |
| $TiO_2$ | | — | 2.0 | 1.0 | 3.0 | 0.5 | — | — | — |
| Alkali-resistance | 1N-NaOH 24 hours at 80° C | — | — | 0 | 0.55 | 0.32 | 0.85 | 3.5 | |
| | 1N-NaOH 24 hours at boiling | — | 0.08 | 0.10 | 3.0 | 0.5 | 1.2 | 7.2 | — |
| | 2.5N-NaOH 24 hours at boiling | 1.8 | 2.0 | 2.5 | — | 5.2 | — | — | — |

All the glass compositions of Examples 1 to 6 of this invention have alkali-resistant properties superior to that of E-glass.

The method for testing the alkali-resistant properties of the glass compositions listed in Table 1 comprised melting and reacting the ingredients at 1240°–1260° C. for 3 hours to form glasses; dipping 8–40 mesh particles of the glasses thus formed in a 4% NaOH solution (1 N) or a 10% NaOH solution (2.5 N) at 80° C. or at boiling for 24 hours; filtering the glass particles; washing undissolved NaOH residue on the filter paper with water, removing the water; drying the glass particles at 110° C.; and weighing the dried glass particles. The alkali-resistance is expressed by the amount of the glass lost (% by weight).

It is clear from the data described above that the alkali-resistant properties of Glasses No. 1 to 6 of the present invention are all superior to that of E-glass.

In order to make a comparison, the composition of the conventional alkali-resistant glass developed in G. Britain and referred to as CEM-FIL are shown as follows:

| Composition of CEM-FIL | % by weight |
|---|---|
| $SiO_2$ | 61.7 |
| $Al_2O_3$ | 1.3 |
| CaO | 4.0 |
| $Na_2O + K_2O$ | 15.4 |
| $ZrO_2$ | 16.9 |

Figure 1B:
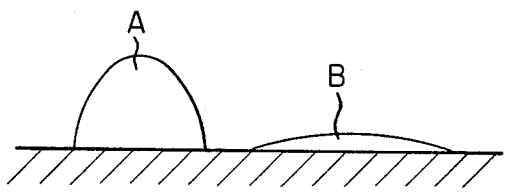

2 g of 100–200 mesh particles of the above CEM-FIL glass and the glass powder of Example 5 (a typical example of the glass composition of this invention) were respectively press-molded under an air pressure of 3 kg/cm² into cylindrical shapes, each having a diameter of 12 mm and a height of 15 mm. The two glasses thus press-molded were placed in a small electric furnace (30 KW) which raised the temperature at a rate of 5° C./min. from 650° C. The glass sample prepared from the glass composition of this invention melted at 750° C. into a hemisphere shape wherein the original height was reduced to about ½ and the original diameter extended about 1.5 times. On the other hand, the CEM-FIL glass did not change at all and retained the original shape at 750° C. When the temperature was raised further to 1100° C., the height of the CEM-FIL glass was reduced by about 20% and the edges became rounded by partly melting, while the glass of this invention was completely melted into a flat plate shape. The states of the glass samples at this melting test are shown in the accompanying FIGS. 1a and 1b. In FIGS. 1a and 1b, "A" represents CEM-FIL glass and "B" represents the glass composition of this invention of Example 5. FIG. 1a shows the states of the glass samples at 750° C., which FIG. 1b shows those at 1100° C. It is clear from these data that the glass composition of this invention provides a lower melting glass.

The following Tables 2 and 3 show various properties of glass fibers prepared in accordance with the conventional technique from the conventional glass composition of Comparative Example 7 and from the glass compositions of Examples 3 and 5 which are typical alkali-resistant glass compositions of this invention.

Table 2 shows temperature conditions with regard to workabilities of fiberization of glass compositions. The working temperature (Tw) in the Table shows the temperature at which the viscosity ($\eta$) is $10^3$ poises.

If the balance between devitrification temperature (Tc) and working temperature (Tw) is not less than 50° C., crystallization and extraneous substance do not occur during the fiberization process.

Table 2

| Temperature Conditions | Examples 3 | 5 | Comparative Example 7 |
|---|---|---|---|
| Devitrification Temperature (Tc) | 1030 | 1000 | 1160 |
| Working Temperature (Tw) | 1100 | 1080 | 1230 |
| Tw − Tc | 70 | 80 | 70 |

Table 3 shows various properties of glass fiber monofilaments prepared without coating greige goods.

Table 3

| Properties | | Examples 3 | 5 | Comparative Example 7 |
|---|---|---|---|---|
| Spinning Conditions | Spinning Temperature | 1100 (° C) | 1080 | 1230 |
| | Spinability | Yarn is sometimes broken | No breaking | No breaking |
| | Spinning Speed | 800 (m/min) | 1400 | 400 |
| | Spin Diameter | 18~20(μ) | 18~20 | 10~12 |
| | Weight loss (%) of glass fiber after treatment with cement solution at 80° C for | 0 | 0 | 5.2 |

Table 3-continued

| Properties | | Examples 3 | Examples 5 | Comparative Example 7 |
|---|---|---|---|---|
| Alkali-resistance | 7 days Strength before treatment with cement solution, kg/mm² | 100 | 107 | 110 |
| | Strength after treatment with cement solution, kg/mm² | 98 | 107 | 31 |
| Retention of Strength (%) | | 98 | 100 | 28 |

The alkali-resistance test for the glass fiber was carried out by dipping 2 g of glass fiber monofilament in a cement synthesis aqueous solution comprising NaOH (0.88 g/l), KOH (3.45 g/l) and $Ca(OH)_2$ (0.48 g/l) at 80° C. for 7 days and measuring the weight loss (%) of the glass fiber.

The strength of the glass fiber was measured by bonding glass fiber monofilament onto a piece of Japanese paper 20 mm × 40 mm with epoxy resin and subjecting the glass fiber bonded onto the Japanese paper to a tensile tester. The test results shown are average values for 30 measurements.

As compared with the conventional alkali-resistant glass fiber of Comparative Example 7 containing 10% by weight of $ZrO_2$, it is clear from Table 3 that the glass fiber of this invention can be spun at a much lower temperature, i.e. 1080°–1100° C. and that the alkali-resistant properties and tensile strength of the glass fiber of this invention are better.

What I claim is:

1. A glass composition for alkali-resistant glass fiber, said composition having a glass liquification temperature of 750°–900° C., which comprises:
   (a) 30–48% by weight of $SiO_2$;
   (b) 12–26% by weight of $ZrO_2$;
   (c) 14–26% by weight of $R_2O$ (wherein R represents Na, K or Li);
   (d) 1–11% by weight of R'O (wherein R' represents Ca, Ba, Mg, Zn or Co);
   (e) 1–5% by weight of $CaF_2$;
   (f) 0.1–10% by weight of $M_2(SiF_6)$ (wherein M represents Na, K or Li); and
   (g) 0.1–12% by weight of $B_2O_3$.

2. A glass composition for alkali-resistant glass fiber according to claim 1, which additionally contains an effective amount of up to 3% by weight of $TiO_2$, an effective amount of up to 3% by weight of $Al_2O_3$ and an effective amount of up to 3% by weight of $Fe_2O_3$.

3. A glass composition according to claim 1 wherein the $CaF_2$ is present at 1.6 to 5% by weight.

4. A glass composition according to claim 2 wherein the $CaF_2$ is present at 1.6 to 5% by weight.

* * * * *